United States Patent [19]

Normann

[11] 4,297,802
[45] Nov. 3, 1981

[54] LINE ROUTING AND STORING DEVICE

[76] Inventor: Carl N. Normann, 1503 Fulton Ave., Apartment 91, Sacramento, Calif. 95825

[21] Appl. No.: 162,184

[22] Filed: Jun. 23, 1980

[51] Int. Cl.³ .............................................. A01K 97/00
[52] U.S. Cl. .......................................... 43/4; 43/21.2
[58] Field of Search ................... 43/4, 4.5, 21.2, 25, 43/25.2

[56] References Cited

U.S. PATENT DOCUMENTS

| 1,198,202 | 9/1916 | Drinkard | 43/21.2 |
| 2,490,279 | 12/1949 | Nunamaker | 43/4 X |
| 2,576,624 | 11/1951 | Miller | 43/21.2 |
| 3,358,399 | 12/1967 | Waldmann | 43/4 |
| 3,363,355 | 1/1968 | Kellner | 43/25 X |
| 3,795,072 | 3/1974 | Sherman | 43/25 |

Primary Examiner—Jimmy C. Peters

[57] ABSTRACT

Line from a conventional reel on a fly-rod proceeds to a line-guiding device, a line-tensioning device and then to a fixed, non-rotatable arbor onto which it is wound by hand. The line is free to uncoil from and axially leave said arbor during the forward cast. The line-guiding device, line-tensioning device and arbor are secured about the waist-line of a fly-fisherman so that the axis of said arbor is directed suitably forward and upward, with the line-guiding device and line-tensioning device being at suitable distances from the arbor.

3 Claims, 2 Drawing Figures

LINE ROUTING AND STORING DEVICE

This invention relates to fly-casting appreciable distances with a conventional shooting-head tied to a conventional trailing shooting-monofilament, hereinafter referred to as a line.

Conventionally, a forward cast is made by releasing coils of line, suspended from either the left hand or mouth of a fly-fisherman, at the instant said shooting-head attains a maximum forward velocity. While the fly-fisherman is wading, said coils of line being mostly submerged in water, characterized by significant viscosity and surface tension, appreciably shorten the trajectory of the forward cast.

When a fly-fisherman is casting from a bank of a stream, or from a boat, said line is stripped in coils onto the ground or boat-bottom respectively, where said line can ensnare various solid objects, and can become damaged by being stepped upon. Under such conditions encirclement of one coil by another is common due to wind forces and residual torques in said line.

Stripping-baskets are used to receive said coils of line. However, said baskets are bulky and permit encirclement of one coil by another; which results in frequent knotting of said line during subsequent forward casts.

A spinning-reel is not conventionally used for fly-casting. Its different mounting position on a rod causes a lack of proper balance in the latter. Further, a spinning-reel required to store a shooting-head, 100 feet of line, and a sufficient length of conventional backing for large fish, would be much larger and more massive than a conventional fly-reel and thus more difficult with which to cast for long periods of time.

One existing type of reel can be used first as a conventional fly-reel for winding line onto it, and then pivoted to permit said line to axially leave its arbor on a forward cast. Each turn of line, wound onto the arbor with no axial rotation, axially leaves said arbor with an additional 360 degrees of line-axis rotation. Such line-twisting is cumulative for successive departure-turns and casts, resulting in a line that cannot be used effectively after a small number of casts.

The general object of this invention is to minimize any and all resisting forces on said line going to rod-guides during trajectory of the shooting-head, thereby enabling significantly longer forward casts.

This object is realized by having provisions in my invention for:

(1) said line to be wound on a cylindrical arbor, eliminating entanglement of one coil by another, and additionally avoiding contact between said line and any other solid matter, or water, on its way from said arbor to rod-guides during the forward cast;

(2) hand-winding said line onto said non-rotating arbor, with line-axis rotation resulting therefrom being exactly cancelled by those occurring during the axial departure of said line from said arbor on a forward cast;

(3) said line to uncoil from and axially leave said arbor in the direction of said guides, thereby minimizing any arbor-departure interference;

(4) routing a segment of said line, from fly-rod reel to line-guide at right-hip and thence to arbor, to minimize any contact between said line segment and coils of said line axially leaving said arbor during a forward cast;

(5) a tensioning means causing tensile forces in segments of said line between said reel and arbor, assuring said segments do not contact said like axially leaving said arbor on a forward cast; and, (6) the above routing and storing of said line which enable the use of said line of lowest mass per linear foot, thereby minimizing resisting accelerating-forces, as well as air-resisting forces, on said line during trajectory of the forward cast.

Another object of this invention is to provide a relatively simple, small, low-cost design that is convenient to use, and that will withstand many years of normal usage and storage.

This invention is to be used in combination with, not in place of, a conventional fly-reel.

These and other objects, advantages, and features of the invention will be better understood from the following detailed description, for a right-handed fly-caster, reference being taken to the accompanying drawing in which.

Figure 1:
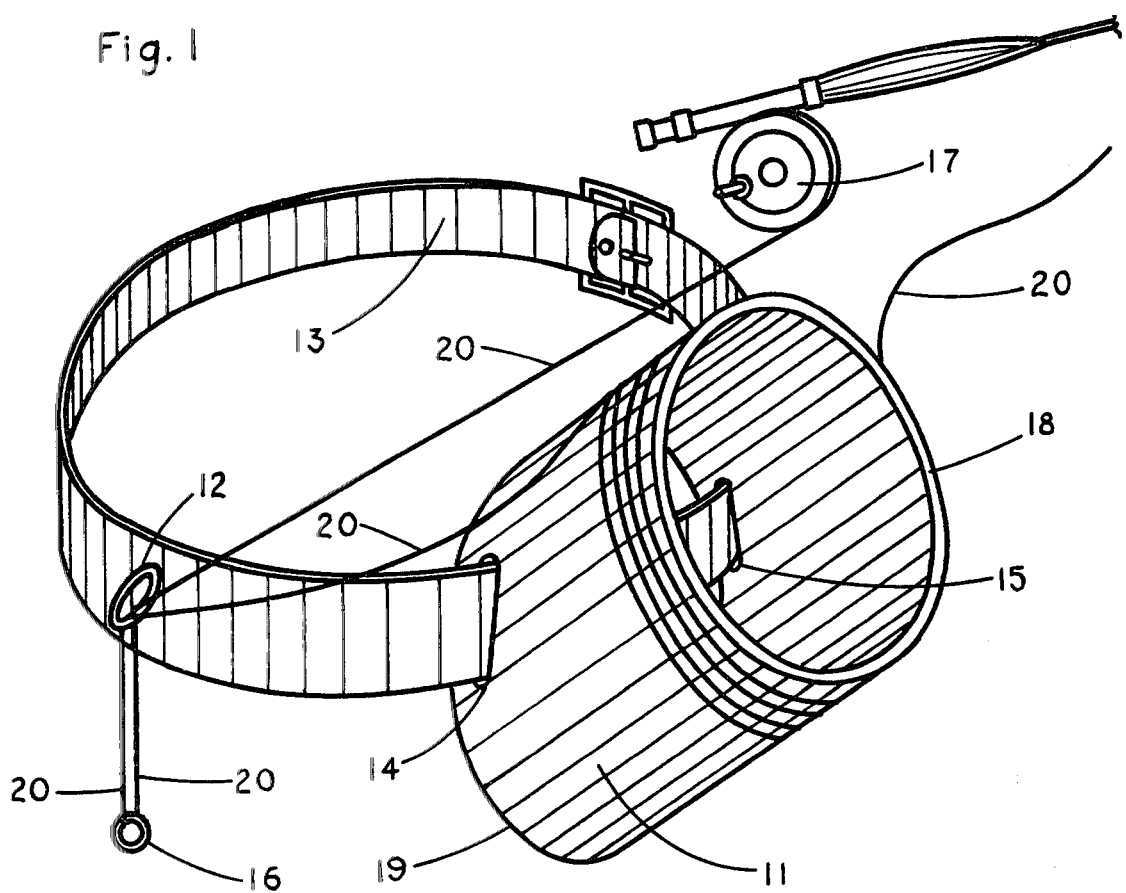
FIG. 1 is a perspective view of invention, with fly-rod, reel and line.

FIG. 1 illustrates arbor 11 and line-guide 12 secured about the waist-line of a fly-fisherman by conventional belt 13. Belt 13 passes through two aligned slots 14 and 15 in arbor 11, as shown. In such secured position, the axis of arbor 11 points forward and upward in the general direction of the conventional stripping-guide on a fly-rod during trajectory of the forward cast; which direction serves to minimize any departure-friction on line leaving arbor 11.

Line-guide 12 is a conventional ring of solid, circular cross-section, attached to belt 13 by conventional means so plane of said ring is normal to outer surface of belt 13, at center of said attachment, and inclined forward 45 degrees from vertical axis of said fly-fisherman. Such orientation of line-guide 12, said guide being of sufficient size, permits easy passage through it of tension-weight 16, a conventional snap-ring of circular cross-section and suitable mass, sufficiently large to prevent its being wound onto conventional fly-reel 17.

Arbor 11 can be conveniently cut from a length of conventional ABS pipe, or plastic tubing, having suitable ouside diameter and length for hand-winding and storing line. To properly guide hand-winding, the upper-and-outer end 18 of arbor 11 is in a plane approximately perpendicular to said axis of arbor 11. The lower-and-inner end 19, of arbor 11, cut at an angle to axis of arbor 11, securely locates on waist-line of said fly-fisherman with said orientation of axis of arbor 11.

In said secured position, line-guide 12 is located at the right-hip of a right-handed fly-caster.

To prepare the invention for a forward cast:

(1) strip a measured length of line 20 from reel 17;

(2) with right hand, snap tension-weight 16 onto line 20, near reel 17, pull to, and pass tension-weight 16 back through, line-guide 12;

(3) release tension-weight 16 with sufficient slack in line 20 to permit tension-weight 16 to drop to position approximately one foot below line-guide 12;

(4) hand-wind remainder of said stripped line onto arbor 11, having butt-end of shooting-head a few feet overboard from rod-tip; and, (5) grasp line 20, near stripping-guide in left hand, with right hand holding rod-handle ready for casting.

During conventional false and forward casts, reel 17 is at various distance from line-guide 12. Such variation is accommodated with maintained tautness in line 20, between line-guide 12 and each reel 17 and arbor 11, by the rising and falling of tension-weight 16. Thus, said sections of lines are kept remote from and prevented from interfering with any line 20 uncoiling from and axially leaving arbor 11 during trajectory of a forward cast.

More than sufficient line 20 for a forward cast is wound onto arbor 11. When a fish strikes and runs, not only is all line 20 permitted to leave arbor 11, but the resulting tensile force in outgoing line 20 pulls tension-weight 16 upward through line-guide 12 thus releasing line 20 directly to reel 17, with tension-weight 16 suspended on line 20 between conventional stripping-guide and reel 17. At a convenient time during the conventional playing of a fish off the reel, tension-weight 16 may be unsnapped from line 20 and snapped onto line-guide 12 for safekeeping. Thus, only at the start of fishing, and after the playing of a fish, need line 20 be routed from reel 17 to line-guide 12 and tension-weight 16, before being wound onto arbor 11. Otherwise line 20 is only alternately wound onto and cast from arbor 11.

Figure 2:
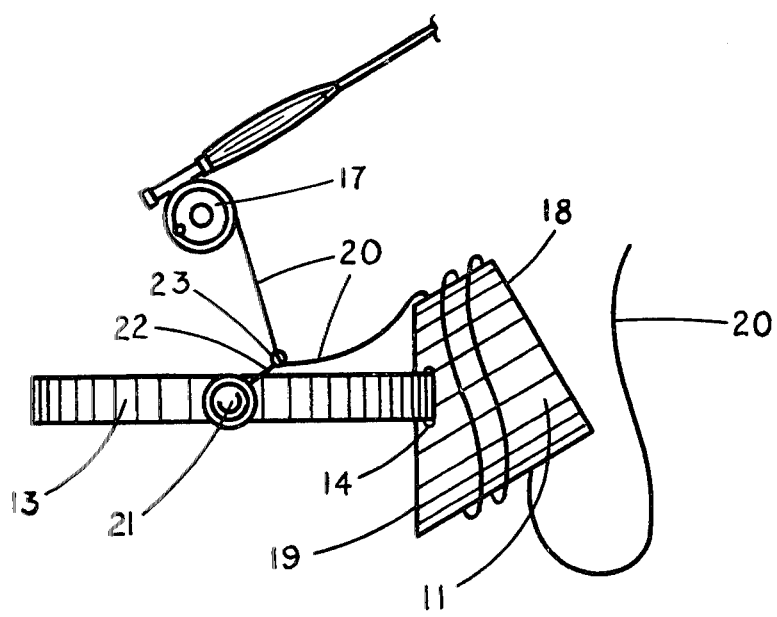
FIG. 2 is a side elevation of a second embodiment of the invention.

FIG. 2 illustrates a second embodiment of the invention wherein a combination of the above line-guiding and line-tensioning means, conventionally attached to belt 13 where shown, comprises spring-actuated reel 21, sitable line 22 attached to and wound onto said reel 21, and conventional snap-ring 23 suitably fastened to outer end of said line 22.

Having thus described the invention, it is understood that certain modifications in construction and arrangement of parts thereof will be made, as deemed necessary, without departing from the scope of the appended claims.

I claim:

1. A line routing and storing device comprising line-guiding means, line-tensioning means, non-rotating arbor, and locating-and-fastening means for securing said line-guiding means and arbor about the waist-line of a fisherman; said arbor to be positioned and oriented so that its axis points in a suitably forward and upward direction from said waist-line; said line-guiding means and line-tensioning means to be suitably and remotely positioned from said arbor, and to be operably connected by said line between a conventional fly-reel, conventionally mounted on a fly-rod, and said arbor onto which said line is wound by hand.

2. The device described in claim 1, wherein said line-tensioning means comprises a mass acting under force of gravity and having a means for suitably capturing and releasing said line.

3. The device described in claim 1, wherein said line-tensioning means comprises a means for suitably capturing and releasing said line; said means being acted upon by suitable forces of an attached and deflected spring.

* * * * *